(12) United States Patent
De La Mota Mendiola et al.

(10) Patent No.: US 12,377,623 B2
(45) Date of Patent: Aug. 5, 2025

(54) METHOD FOR MANUFACTURING A VESSEL AND A DOUBLE-WALL TANK

(71) Applicant: Airbus Operations S.L.U., Getafe (ES)

(72) Inventors: Matilde De La Mota Mendiola, Getafe (ES); Jesús Javier Vázquez Castro, Getafe (ES); Asunción Butragueño Martínez, Getafe (ES)

(73) Assignee: AIRBUS OPERATIONS S.L.U., Getafe (ES)

( * ) Notice: Subject to any disclaimer, the term of this patent is extended or adjusted under 35 U.S.C. 154(b) by 217 days.

(21) Appl. No.: 18/307,252

(22) Filed: Apr. 26, 2023

(65) Prior Publication Data

US 2023/0347606 A1 Nov. 2, 2023

(30) Foreign Application Priority Data

Apr. 29, 2022 (EP) ..................... 22382415

(51) Int. Cl.
*B29C 70/34* (2006.01)
*B29C 70/30* (2006.01)
(Continued)

(52) U.S. Cl.
CPC .......... *B29D 22/003* (2013.01); *B29C 70/302* (2021.05); *B29C 70/342* (2013.01);
(Continued)

(58) Field of Classification Search
CPC ....... B29C 70/302; B29C 70/32; B29C 70/34; B29C 70/342; B29C 70/36; B29C 70/38; B29C 70/382; B29C 70/386; B29C 70/42; B29C 70/44; B29C 70/443; B29C 70/446; B29C 70/54; B29C 70/541; B29C 70/368; B29C 70/681; B29C 70/682; B29C 70/683; B29C 70/70; B29C 70/84; B29C 70/86; B29C 70/865; B29D 22/003; B29L 2031/712; B29L 2031/7126;
(Continued)

(56) References Cited

U.S. PATENT DOCUMENTS

2006/0169704 A1 8/2006 Brunnhofer
2006/0261073 A1* 11/2006 Kanno ...................... F17C 1/08
220/581
(Continued)

FOREIGN PATENT DOCUMENTS

EP 3667152 A1 6/2020
FR 3107332 A1 8/2021

OTHER PUBLICATIONS

European Search Report for European Patent Application No. 22382415 dated Oct. 24, 2022; priority document.

*Primary Examiner* — Michael A Tolin
(74) *Attorney, Agent, or Firm* — Greer, Burns & Crain, Ltd.

(57) ABSTRACT

A method for manufacturing a vessel configured for housing a fluid within, the method comprising: providing two Fiber Reinforced Polymer (FRP) structures shaped with complementary coupling interfaces configured to match with each other, such that an interior volume is defined when the FRP structures are coupled to each other; coupling the FRP structures to each other such that the interior volume is defined; and fastening the FRP structures after they have been coupled to each other.

15 Claims, 4 Drawing Sheets

(51) Int. Cl.
  *B29C 70/68* (2006.01)
  *B29C 70/70* (2006.01)
  *B29C 70/84* (2006.01)
  *B29C 70/86* (2006.01)
  *B29D 22/00* (2006.01)
  *B29L 31/00* (2006.01)

(52) U.S. Cl.
  CPC ............ *B29C 70/682* (2013.01); *B29C 70/70* (2013.01); *B29C 70/84* (2013.01); *B29C 70/865* (2013.01); *B29L 2031/7156* (2013.01)

(58) Field of Classification Search
  CPC ..... B29L 2031/7154; B29L 2031/7156; B29L 2031/7172; F17C 1/02; F17C 1/04; F17C 1/06; F17C 1/12; F17C 1/16; F17C 2201/01; F17C 2201/0104; F17C 2201/0109; F17C 2201/0138; F17C 2203/03; F17C 2203/0391; F17C 2203/0619; F17C 2203/0629; F17C 2203/066; F17C 2203/0663; F17C 2203/0665; F17C 2203/0668; F17C 2203/067; F17C 2203/0673; F17C 2209/2109; F17C 2209/2154; F17C 2209/2163; F17C 2209/22; F17C 2209/224; F17C 2209/227; F17C 2209/23; F17C 2209/232; F17C 2209/234; F17C 2221/011; F17C 2221/012; F17C 2223/0153; F17C 2223/0161; F17C 2223/033; F17C 2260/012; F17C 2260/016; F17C 2265/066; F17C 2270/0186; F17C 2270/0189; F17C 2270/0197

See application file for complete search history.

(56) References Cited

U.S. PATENT DOCUMENTS

| | | |
|---|---|---|
| 2008/0187697 A1 | 8/2008 | Amano |
| 2014/0191499 A1 | 7/2014 | Campbell |
| 2021/0254787 A1 | 8/2021 | Takami et al. |
| 2022/0034449 A1 | 2/2022 | Katano |
| 2022/0034451 A1* | 2/2022 | Katano ................. B29C 53/605 |

* cited by examiner

METHOD FOR MANUFACTURING A VESSEL AND A DOUBLE-WALL TANK

CROSS-REFERENCES TO RELATED APPLICATIONS

This application claims the benefit of the European patent application No. 22382415.2 filed on Apr. 29, 2022, the entire disclosures of which are incorporated herein by way of reference.

FIELD OF THE INVENTION

The present invention belongs to the field of fluid storage systems and manufacturing methods thereof. Particularly, it refers to a method for manufacturing a vessel by means of integrating components which are afterwards assembled and equipped together.

More in particular, the invention refers to a method for manufacturing a double-wall tank provided with thermal insulation between the inner vessel which houses a fluid in cryogenic conditions, such as liquid hydrogen, and the outer wall of the double-wall tank.

BACKGROUND OF THE INVENTION

Due to environmental reasons, challenges to reduce the use of fossil fuels must be increasingly faced. In this scenario, green hydrogen produced on the basis of renewable energy is a reasonable candidate for efficient energy supply. Its high energy density makes it an emerging alternative fuel for aircraft applications.

In particular, hydrogen is an attractive fuel for high-altitude aircraft because it contains about 2.8 times the energy per pound as compared with traditional hydrocarbon fuels. Therefore, in aircraft applications the high specific energy of hydrogen may be a key enabler. However, practical considerations have largely prevented its use. While the specific energy of hydrogen is very high, the energy per unit volume is comparatively low. Liquid hydrogen enhances its energy density relative to gaseous form while allowing a reduction of the mass of the tank required to confine the hydrogen within as a result of the lower pressure in a liquid state. Liquid hydrogen at 20 K and 1 bar pressure has a density of 70 g/l compared to the 40 g/l of gaseous hydrogen at 88 K and 700 bar. Only cryo-compressed hydrogen has a higher density, with a value of 80 g/l at 38 K and 300 bar. According to these parameters, liquefied cryogenic form allows efficient storage at low pressure, and is a viable option for long flight duration aircraft.

In this regards, liquid di-hydrogen (LH2) cryotanks are one of the key components of the structure of future generations of heavy lift launch vehicles, space exploration structures and new green aircraft. It is in aircraft where the greatest challenges lie in developing hydrogen storage systems as a result of the need for reduced weight, in combination with longest dormancy time requirements, leading to good insulating and permeation properties. Some of the key challenges are geometry, temperature, pressure, permeation, thermal insulation and hydrogen embrittlement, vacuum tightness, system integration inside the tank and the tank integration in the aircraft structure.

In order to take advantage of the high specific energy of hydrogen, the associated tanks should be preferably light weight and the method of insulating a tank must deal with several types of heat transfer: conduction through solids, conduction and convention through gas, and radiation. Some methods of effecting high-performance insulation rely on a vacuum to nearly eliminate the conduction and convection gas heat transfer.

Taking into account the aforementioned conditions, the solutions developed by the industry that are currently in use consist of tanks that include structures and elements such as the following:

Double-wall tanks comprising an outer jacket and inner metallic pressure vessels. These vessels are normally made from aluminum or steel, and are among the most conventional tanks used, mainly because they are economical and reliable. However, they are also the heaviest type of tanks used for confining cryo-compressed hydrogen.

Metallic pressure vessel/liner with a composite reinforcement overwrap. The metal and the composite material share the structural load. Manufacturing costs with respect to the previous alternative are reduced and also the weight is significantly reduced.

SUMMARY OF THE INVENTION

The present invention provides a solution for the aforementioned problems, by a method for manufacturing a vessel configured for housing a fluid, such as LH2.

In a first inventive aspect, the invention provides a method for manufacturing a vessel configured for housing a fluid within, the method comprising:
   a) providing at least two inner Fiber Reinforced Polymer (FRP) structures shaped with complementary coupling interfaces configured for matching with each other, such that an interior volume is defined when the inner FRP structures are coupled to each other;
   b) coupling the inner FRP structures to each other;
   c) providing at least two outer FRP structures shaped with complementary coupling interfaces configured for matching with each other, such that a sheathing is defined when the outer FRP structures are coupled to each other, the sheathing being sized for encasing the inner FRP structures, contacting them on their outer surface, after they have been coupled according to step b);
   d) coupling the outer FRP structures to each other, encasing the inner FRP structures such that the relative position of the inner FRP structures is locked thereby; and
   e) fastening the outer FRP structures after they have been coupled to each other.

Throughout this entire document, a 'prepreg' should be understood as a composite material made from "pre-impregnated" fibers and a partially cured polymer matrix, such as epoxy or phenolic resin. The matrix is used to bond the fibers together. The curing process induces chemical reactions that create extensive cross-linking between polymer chains to produce an infusible and insoluble polymer network. During crosslinking at sufficiently high temperatures, the material changes from a liquid via a gel into a glass-like solid.

With respect to the lay-up techniques referred to throughout the document, Automated Tape Laying (ATL) or Automated Fiber Placement (AFP), both processes are functionally similar, comprising applying resin-impregnated fiber material (the so-called 'prepreg').

However, each process is used differently to achieve specific structure construction goals to provide strength or stiffness where needed. Particularly, the use of one or the other mainly depends on the geometry complexity of the part to manufacture, in which AFP allows higher curvatures.

The 'tooling' shall be understood as the set of instruments and tools that are used and contribute to optimizing the performance of the manufacturing process operations of the FRP structures, or composite materials. Examples of 'tooling' comprise:
- molds;
- vacuum bags;
- caul plates;
- heating equipment;

Typically, a number of composite plies or tapes are laid-up one upon the other on a mold, thus resulting in a stack of plies. In this regard, a 'ply' should be understood as a single continuous area of composite material to be laid on a form, where two plies in the same layer do not normally overlap. The laying-up of plies forms a stuck which is known as a 'laminate' or as a whole 'preform'. The molds, mandrels or male molds should be regarded as shaping surfaces for manufacturing an item on the mold so that the item acquires the shape of the mold at least on its face in contact with the mold.

Additionally, the fibrous material reinforcement may be glass (for Glass Fiber Reinforcement Polymer, 'GRFP'), carbon (for Carbon Fiber Reinforcement Polymer, 'CRFP'), polymer fibers or any other conventional material used as reinforcement.

Among them, carbon is preferred.

On the other hand, the form-up step (the so-called 'preforming') may be done by two different technologies, hot forming or press-forming. Briefly, hot-forming uses a membrane and heat, while the press-forming uses a press and force.

Therefore, multiple combinations of manufacturing processes (i.e., related to tool options) can be used.

Hydrogen Embrittlement is a form of hydrogen damage stemming from the diffusion of atomic hydrogen into certain types of metals due to the cryogenic temperature range to keep hydrogen in a liquid state. In the presence of hydrogen, metallic materials lose their ductile properties and become vulnerable to brittle fracture. Crack initiation and propagation can occur internally and on the surface of a component.

The FRP structures provided in step a) can be assembled (i.e., coupled to each other) in such a way as to define an interior volume where the fluid is intended to be confined. In this sense, it will be understood that the FRP structures are provided with a complementary geometry or shape such that they can couple to each other, according to step b), by means of a coupling interface which, in an embodiment, can be the contour and boundaries of the FRP structures, which are outlined so as to match with each other.

In turn, the outer FRP structures provided in step c), close on the inner FRP structures, as a second skin or sheathing. That is, once coupled, the outer FRP structures are in contact with the inner FRP structures through the corresponding interfaces, that is, the outer surface of the inner FRP structures (with respect to the inner volume) and the inner surface of the outer FRP structures. In this way, the outer FRP structures contribute to holding the inner FRP structures together, locking the relative position of the inner FRP structures thereby, while also increasing the overall tightness of the vessel.

Advantageously, the use of these additional outer FRP structures results in a thicker wall of the vessel which reinforces its load bearing capabilities and gas permeation properties.

In an embodiment, the outer FRP structures are coupled such that the joint line defined between them intersects the joint line defined between the inner FRP structures at an oblique angle.

It will be understood that an oblique angle is one that differs from a null angle or a 180 degree angle. That is, according to this embodiment, the joint line defined by the coupling of the inner FRP structures and the joint line defined by the outer FRP structures will intersect at a certain angle (i.e., not being parallel or coincident). Advantageously, the tightness of the vessel is improved, given that there will not be a continuous fluidic path through the joint lines, as it would be the case of an embodiment wherein the joint lines are parallel or coincident.

In a preferred embodiment, in step d), the outer FRP structures are coupled such that the joint defined between them intersects the joint defined between the inner FRP structures at an angle of at least 15 degrees, beneficially at an angle of at least 40 degrees, and in some embodiments at a 90 degree angle.

After the FRP structures have been coupled according to step b) for the case of the inner FRP structures and/or according to step d) for the case of the outer FRP structures, the outer FRP structures are fastened, locking the relative position of the inner FRP structures thereby, such that the resulting assembly is prevented from breaking down, that is, the FRP parts are prevented from separating and the fluid housed within the inner volume is also prevented from leaking out.

According to embodiments of the invention, the FRP structures involved in the manufacturing of the vessel (that is, the inner and optionally the outer) may comprise complementary coupling means provided on the corresponding coupling interfaces; the complementary coupling means being configured for interlocking with each other such that the relative position of the FRP structures is locked thereby. In this regard, examples of complementary geometries to facilitate the coupling of the FRP structures and improve their tightness afterwards may be such as tongue and groove, labyrinth joints, flanges, etc.

In an embodiment, the method comprises providing a first joint profile at least on a portion of the joint defined between the inner FRP structures.

In an embodiment, the method comprises providing a second joint profile at least on a portion of the joint defined between the outer FRP structures.

A joint profile should be understood as a compression seal, for example a seal based on elastomers, provided between the FRP structures before they are coupled according to step b) and/or according to step d). The provision of the joint profile provides the coupling interfaces with additional sealing capabilities and protection against relative movement between the FRP structures. In an embodiment, the joint profile comprises a cover, such that a rigid strip or platen extends out of the joint covering the joint and providing additional sealing protection against leakages.

This way of providing a series of separate parts (the FRP structures) that are assembled at a later step to give rise to the final geometry of the vessel, enables the installation inside the vessel of various systems and structural elements in a comfortable manner. In particular, a plurality of internal systems, such as anti-sloshing walls, pipes, baffle rings, optical guides and/or level sensors can be installed separately in the FRP structures before they are coupled to each other.

Advantageously, due to the sequential concept proposed by the method of the invention, according to which a vessel is manufactured by coupling FRP structures, systems and structural elements are integrated in a much more efficient and flexible manner compared to other configurations wherein the volume/vessel which houses the fluid within is manufactured as a monolithic/single piece and/or in a one-shot process.

Additionally, by virtue of the aforementioned sequential concept, the method also envisages the provision of 'discontinuities' in the final geometry of the vessel, the discontinuities being adapted for the installation and/or insertion of external elements such as pipes, tubing, or other auxiliary system supports. In this sense, a 'discontinuity' shall be understood as a lack of continuity of the ply and/or the laminate; that is, such as a cut, a notch, or a breakthrough hole.

According to conventional manufacturing processes, this kind of discontinuities are normally provided at a separate step by any finishing operation (e.g., numerical cutting process), thus increasing the number of manufacturing steps.

On the contrary, according to the method of the invention, any discontinuity may be introduced during the laying-up process of a FRP structure either in a middle section of the FRP structure or by profiling the contour (i.e., the coupling surface). In particular, the complementary geometries of the coupling surfaces can be shaped such that, when the FRP structures are coupled according to step b), the discontinuities are formed along the joint between the FRP structures. For example, a half-hole may be formed in each FRP structure such that when two FRP structures are coupled a hole for the passage of a tube is formed at their junction.

The use of composite material for the FRP structures that define the interior volume of the vessel where the fluid is housed to carry out the functions of withstanding the structural load as well as acting as a barrier for preventing gas permeation, result in a much lighter vessel compared to conventional vessels using metallic parts. Furthermore, the Gravimetric Index (GI), that is, the weight of the vessel/tank vs. weight liquid hydrogen compared to the metallic alternative is also improved.

In addition, the versatility provided by the possibility of manufacturing the FRP structures using the composite manufacturing techniques described above translates into an optimal selection of ply and laminate thicknesses that provides control over the permeability of the vessel and prevents the appearance of the phenomenon of micro-cracking due to cold embrittlement.

More particularly, the versatility of the method allows to combine 'thin plies' with 'standard plies' to form the laminates which are part of the FRP structures.

In this sense, it will be understood that ply thickness is normally greater than 0.1 mm. Reducing the ply thickness down to this limit is usually referred to as thin-plies. In the context of the present invention, thin-plies will be considered as plies with a thickness between 0.04 mm and 0.1 mm.

The combination depends on the ratio of the total thickness of the vessel desired to be manufactured using the thin plies. In an embodiment, the FRP structures are composed entirely of thin plies.

In an embodiment, the outer FRP structures provided in step c) are partially cured; and step e) comprises applying a curing cycle under vacuum for curing the outer FRP structures after they have been coupled to each other according to step d).

This curing process allows to integrate and consolidate the outer FRP structures present in such a way as to obtain a vessel with homogeneous wall structural features, as a single piece of CFRP. This way, the cured outer FRP structures lock the inner FRP structures in place.

In an embodiment, the inner and outer FRP structures are partially cured; and step e) further comprises applying a curing cycle under vacuum for curing inner and outer FRP structures after they have been coupled according to steps b) and d), respectively.

This curing process allows the integration and consolidation of the inner and outer FRP structures present in such a way as to obtain a vessel with homogeneous wall structural features, as a single piece of CFRP. The inner and outer FRP structures lock each other during the curing so as to form a single vessel.

The properties of any FRP structure, or composite material are determined by the manufacturing process conditions. Accordingly, a 'partially cured, or 'pre-cured', fiber reinforced (FRP) structure', should be understood as structures composed of composite materials—in particular materials comprising a thermoset polymer—which have undergone an incomplete curing cycle, or 'partial curing cycle' compared to the application of a complete curing cycle under predetermined duration and temperature conditions according to which the FRP structures have reached the desired chemical and mechanical properties, and so can be considered as 'completely cured', or simply 'cured'.

In an embodiment, the method comprises, before step a), manufacturing a FRP structure by laying up a laminate formed by FRP plies provided over a mold by Automated Fiber Placement (AFP) or Automatic Tape Layup (ATL) techniques and by applying, after the laminate has been laid up:
a curing cycle under vacuum; or
a partial curing cycle.

In an embodiment, the method comprises, before step a), manufacturing a FRP structure according to the following steps:
laying-up an ensemble formed by a honeycomb core and, at least on one side on the honeycomb core, from the inside to the outside: a curable adhesive layer and an amorphous thermoplastic film;
laying-up a dry fiber layer over the ensemble;
arranging the dry fiber and ensemble on a one-sided mold and confining it in a gas-tight space by arranging a vacuum sheet over the one-sided mold;
infusing the dry fiber layer under vacuum with resin; and
applying a curing cycle under vacuum; or
a partial curing cycle.

Advantageously, the FRP structures obtained by these steps comprising a panel with a honeycomb core are provided with an optimized core sealing solution for preventing infused resin from entering into the honeycomb core open cells, thus improving its mechanical properties, especially for curved or highly curved panels.

In an embodiment wherein the inner and outer FRP structures provided in steps a) and c) are completely cured, all the FRP structures, before the steps a) and c), are subjected together to the curing cycle under vacuum, thus reducing the total number of steps and associated costs involved in manufacturing a double-wall tank by the method of the invention.

In an embodiment, at least one of the inner FRP structures provided in step a) comprises at least one baffle and/or wall-type element projecting from a surface of the FRP structure towards the interior volume defined when the inner FRP structures are coupled to each other according to step b).

Sloshing is a known undesirable phenomenon that affects fluids stored within a container or tank and which is caused by the jostling to which the container may be subjected, especially if the container is mounted on a vehicle. As a result of this jostling, lateral forces are exerted on the liquid propellant, tending to cause a non-uniform fluid flow along a longitudinal extent of the container wall and associated non-uniform distribution of the fluid across the width of the container.

The sloshing motion of the fluid can induce significant structural loads and rigid body disturbances which may affect control system operation. The presence of the baffles and/or wall-type elements installed within the inner volume of the vessel, extending inwardly from an inner surface helps to attenuate sloshing.

In an embodiment, the method comprises, before applying the curing cycle or the partial curing cycle under vacuum: laying up a laminate forming the at least one baffle and/or wall-type element, the laminate being laid up preferably by ATL or AFP techniques.

In an embodiment, step e) comprises, after coupling the outer FRP structures according to step d),
  winding at least one layer of FRP material onto at least a portion of the outer FRP structures; and
  curing the assembly resulting from winding the later of FRP material.

The layer of FRP material is provided preferably by automated fiber placement (AFP), or by filament winding techniques, wrapping at least a portion of the assembly.

With respect to the 'filament winding' techniques, it should be understood as a composite material structures manufacturing process used mainly for hollow parts, generally circular or oval section components, such as pipes and containers, and consisting of winding tensioned reinforcing fiber filaments and/or tapes, impregnated with a thermosetting resin, on male mold or mandrel. Conventionally, the male mold is rotated, while a carriage moves horizontally, orienting the fibers in the desired pattern. Once the male mold is completely covered to the desired thickness and distribution pattern of filaments, the resin may be cured. Once the resin has been cured, the male mold is removed (unmold process), leaving the final product hollow.

Filament winding is a process that can be automated, where the tension of the filaments can be carefully controlled. The orientation of the filaments can also be carefully controlled so that the layers are laminated and oriented differently from the previous layer. The angle at which the fiber of the lower layers is established determines the properties of the final product.

Advantageously, this embodiment of the method simplifies the tooling concept and reduces the associated resource costs because, having coupled outer FRP structures according to step d), that is, encasing the inner FRP structures such that the relative position of the inner FRP structures is locked, the resulting assembly itself serves as a male mold on which the filament winding process takes place. Moreover, the tension applied on the wound filament also maintains the inner and outer FRP structures against each other during their winding.

With respect to the curing process of the assembly, the heating means used for applying the curing cycle may be an autoclave or, alternatively, an oven.

In a second inventive aspect, the invention provides a method for manufacturing a double-wall tank configured for housing a fluid within, the method comprising:

i) providing an inner vessel manufactured according to any of the embodiments of the method of the first inventive aspect;

ii) providing at least two inner Fiber Reinforced Polymer (FRP) tank structures shaped with complementary coupling interfaces configured for matching with each other, such that an interior chamber is defined when the inner FRP tank structures are coupled to each other, the interior chamber being sized for housing the vessel provided in step i); such that a gap is defined between the outer side of the inner vessel and the inner side of the inner FRP tank structures when the inner vessel is housed within the interior chamber;

iii) coupling the inner FRP tank structures to each other enclosing the vessel provided in step i) within;

iv) providing at least two outer FRP tank structures shaped with complementary coupling interfaces configured for matching with each other, such that a sheathing is defined when the outer FRP tank structures are coupled to each other, the sheathing being sized for encasing the inner FRP tank structures, contacting them on their outer surface, after they have been coupled according to step iii);

v) coupling the outer FRP tank structures to each other, encasing the inner FRP tank structures, such that the relative position of the inner FRP tank structures is locked thereby; and vi) fastening the outer FRP tank structures after they have been coupled to each other.

The double-wall tank manufactured by the method comprises essentially three basic structural elements: an inner vessel according to the first inventive aspect provided in step i), intended for housing a fluid within, and which is considered as the inner wall of the so called double-wall tank; an outer wall provided surrounding the inner vessel after coupling the inner FRP tank structures according to step iii); and an intermediate gap or space disposed between the inner vessel (i.e. inner wall) and the outer wall, the intermediate space intended for providing thermal insulation to the inner vessel, which, in the case of containing a cryo-compressed fluid, such as hydrogen, will be exposed to extremely low temperatures.

Just like the interior volume of the inner vessel provided in step i), the outer wall of the tank is provided by coupling the inner FRP tank structures provided in step ii), according to step iii).

In particular, once they have been manufactured, the inner FRP tank structures provided in step ii) are ready to be assembled (i.e., coupled to each other) in such a way as to define the interior chamber where the inner vessel provided in step i) is intended to be confined. In this sense, it will be understood that the inner FRP tank structures are provided with a complementary geometry or shape such that they can couple to each other, according to step iii), by means of a coupling interface. In an embodiment, the coupling interface is the contour and boundaries of the inner FRP tank structures, which are outlined so as to match with each other.

The outer FRP tank structures close on the inner FRP tank structures, as a second skin or sheathing. That is, once coupled, the outer FRP tank structures are in contact with the inner FRP tank structures through the corresponding interfaces, that is, the outer surface of the inner FRP tank structures (with respect to the interior chamber), and the inner surface of the outer FRP tank structures. In this way, the outer FRP tank structures contribute to holding the inner FRP tank structures together.

Advantageously, the use of these additional outer FRP tank structures results in a thicker wall of the inner vessel which reinforces its load bearing capabilities and thermal insulation capabilities.

After the FRP tank structures have been coupled according to step iii) for the case of the inner FRP tank structures and/or according to step v) for the case of the outer FRP tank structures, the outer FRP tank structures are fastened, locking the relative position of the inner FRP structures thereby, such that the resulting assembly is prevented from breaking down, that is, the FRP tank parts are prevented from separating.

According to embodiments of the invention, the FRP tank structures involved in the manufacturing of the double-wall tank (that is, inner and optionally the outer) may comprise complementary coupling means provided on the corresponding coupling interfaces; the complementary coupling means being configured for interlocking with each other such that the FRP tank structures are fastened thereby. In this regard, examples of complementary geometry to facilitate the coupling of the FRP structures and improve their tightness afterwards may be such as tongue and groove, labyrinth joints, flanges, etc.

In an embodiment, the method comprises providing a third joint profile at least on a portion of the joint defined between the inner FRP tank structures.

In an embodiment, the method comprises providing a fourth joint profile at least on a portion of the joint defined between the outer FRP tank structures.

In an embodiment, at least one spacer provided between the outer side of the inner vessel and the inner side of the inner FRP tank structures coupled according to step iii).

Advantageously, in order to define the intermediate gap or space disposed around the inner vessel, between its outer side and the outer wall of the tank, at least one spacer contributes to maintaining the outer wall of the tank separated at a predetermined distance from the inner vessel.

In an embodiment, the method comprises providing a plurality of discrete mechanical spacers distributed around the inner vessel for maintaining the distance between the inner wall and the outer wall.

In an embodiment, a polar mount is provided between the outer side of the inner vessel and the inner side of the inner FRP tank structures coupled according to step iii), such that they are maintained separated at a predetermined distance.

The polar mounts are mounted between the inner vessel and the outer vessel in proximity to their longitudinal (or polar) ends.

This way of providing a series of separate parts (the FRP tank structures), which are assembled at a later step to give rise to the final geometry of the outer wall of the double-wall tank, enables the provision and integration of various systems and structural elements inside the tank in an efficient and flexible manner. In particular, a plurality of internal systems, such as pipes, tubing can be installed separately in the FRP tank structures and/or in the space confined between the inner wall of the tank (i.e., the inner vessel provided in step i)) and the outer wall of the tank, before the FRP tank structures are coupled to each other.

In an embodiment, the method comprises evacuating air from within the intermediate gap defined between the inner vessel and the outer wall of the tank and then sealing this envelope from outer atmosphere, thus creating a vacuum thermal insulation.

In an embodiment, the method comprises, before step iii), providing at least a thermal insulation layer enveloping the vessel.

In an embodiment, in the space confined between the inner wall of the tank (i.e., the inner vessel provided in step i)) and the outer wall of the tank, an insulating material maintained in a vacuum is provided. The vacuum and insulating material help to reduce heat transfer and thereby reduce the boil-off of the fluid, and more in particular, of liquid oxygen, liquid nitrogen or liquid argon which can be stored within the inner vessel.

Additionally, by virtue of the aforementioned sequential concept, the method also envisages the provision of 'discontinuities' in the final geometry of the double-wall tank, and, more in particular, of the outer wall of the tank. The discontinuities are adapted for the installation and/or insertion of external elements such as pipes, tubing, or other auxiliary system supports.

In an embodiment, the complementary geometries of the coupling surfaces can be shaped such that, when the FRP tank structures are coupled according to step iii), the discontinuities are formed along the joint between the FRP tank structures.

At least one of the discontinuities in the outer wall of the tank may be used as a vacuum port to extract air from between the inner wall and the outer wall, and thus obtain a vacuum thermal insulation.

Advantageously, quality inspections and handling during manufacturing process according to step iii) also benefit from the stepwise sequencing and simplified tooling of the method, and thus can be achieved in a more efficient and less resource demanding way.

In an embodiment, the outer FRP tank structures provided in step iv) are partially cured; and step vi) comprises applying a curing cycle under vacuum for curing the outer FRP tank structures after they have been coupled to each other according to step v).

In an embodiment, the inner and outer FRP tank structures are partially cured; and step vi) comprises applying a curing cycle under vacuum for curing the inner and outer FRP tank structures after they have been coupled according to steps iii) and v), respectively.

In an embodiment, the method comprises, before step ii), manufacturing a FRP tank structure by laying up a laminate formed by FRP plies provided over a mold by Automated Fiber Placement (AFP) or Automatic Tape Layup (ATL) techniques and by applying, after the laminate has been laid up:
a curing cycle under vacuum; or
a partial curing cycle.

In an embodiment, the method comprises, before step ii), manufacturing a FRP structure according to the following steps:
laying-up an ensemble formed by a honeycomb core and, at least on one side on the honeycomb core, from the inside to the outside: a curable adhesive layer and an amorphous thermoplastic film;
laying-up a dry fiber layer over the ensemble;
arranging the dry fiber and ensemble on a one-sided mold and confining it in a gas-tight space by arranging a vacuum sheet over the one-sided mold;
infusing the dry fiber layer under vacuum with resin; and
applying a curing cycle under vacuum: or
a partial curing cycle.

In an embodiment wherein the inner and outer FRP tank structures provided in steps ii) and iv) are completely cured, all the FRP tank structures, before the steps ii) and iv), are subjected together to the curing cycle under vacuum, thus reducing the total number of steps and associated costs involved in manufacturing a double-wall tank by the method of the invention.

In an embodiment, step vi) comprises, after coupling the outer tank FRP structures according to step v),
- winding at least one layer of FRP material onto at least a portion of the outer FRP tank structures; and
- curing the assembly resulting from winding the later of FRP material.

The layer of FRP material is provided preferably by automated fiber placement (AFP), or by filament winding techniques, wrapping at least a portion of the assembly.

Advantageously, this embodiment of the method simplifies the tooling concept and reduces the associated resource costs because, having coupled the outer FRP tank structures according to step v), that is, encasing the inner FRP tank structures such that the relative position of the inner FRP tank structures is locked, the resulting assembly itself serves as a male mold on which the filament winding process takes place. Moreover, the tension applied on the wound filament also maintains the inner and outer FRP tank structures against each other during their winding.

With respect to the curing process of the assembly, the heating means used for applying the curing cycle may be an autoclave or, alternatively, an oven.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

The present invention provides a method for manufacturing a vessel (10) configured for housing a fluid within.

This method comprises at least the following steps:
a) providing at least two inner Fiber Reinforced Polymer (FRP) structures (11, 12) shaped with complementary coupling interfaces (11.1, 12.1) configured for matching with each other, such that an interior volume is defined when the inner FRP structures (11, 12) are coupled to each other;
b) coupling the inner FRP structures (11, 12) to each other;
c) providing at least two outer (110, 120) FRP structures shaped with complementary coupling interfaces (110.1, 120.1) configured for matching with each other, such that a sheathing is defined when the outer FRP structures (110, 120) are coupled to each other, the sheathing being sized for encasing the inner FRP structures (11, 12), contacting them on their outer surface, after they have been coupled according to step b);
d) coupling the outer FRP structures (110, 120) to each other, encasing the inner FRP structures (11, 12), such that the relative position of the inner FRP structures (11, 12) is locked thereby; and
e) fastening the outer FRP structures (110, 120) after they have been coupled to each other.

Figure 1:
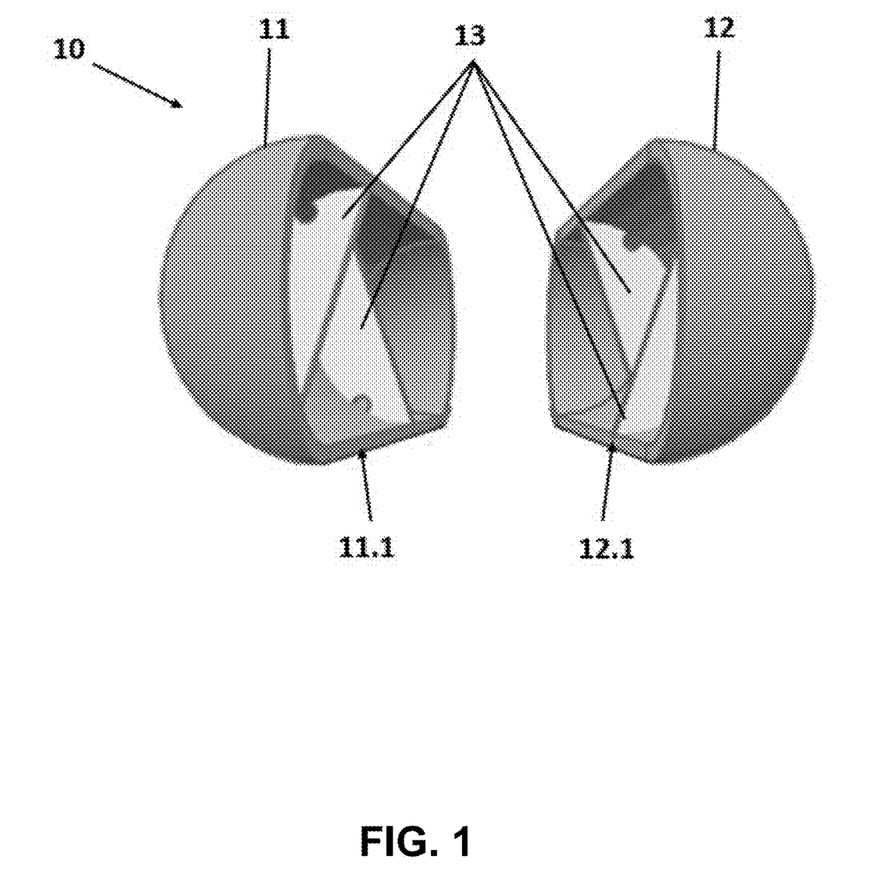
FIG. 1 shows a perspective view of two inner FRP structures provided according to steps of a method for manufacturing a vessel according to an embodiment of the present invention.

FIG. 1 shows some of the manufacturing steps that the present method follows to obtain a vessel (10) according to an embodiment. Particularly, FIG. 1 shows the provision of two inner FRP structures (11, 12) and, more in particular, of a first (11) and a second (12) closed hemicylindrical FRP structures according to step a), the inner FRP structures (11, 12) comprising a hemi-cylindrical central portion with two spherical portions located at the opposite ends of the hemi-cylindrical central portion. More in particular, both inner FRP structures (11, 12) are complementary and, once coupled, they define a capsule-type structure closed at its ends by means of respective spherical cap portions.

In the particular embodiment shown, both hemicylindrical structures (11, 12) have been previously manufactured by applying a complete curing cycle under vacuum. With respect to the layup techniques carried out for obtaining the preform of the first (11) and second (12) FRP structures prior to the application of the curing cycle, according to different embodiments of the above method, the layup techniques may be one of the following:

Laying up a laminate formed by FRP plies provided over a mold by Automated Fiber Placement (AFP) or Automatic Tape Laying (ATL) techniques.

Laying-up an ensemble formed by a honeycomb core and, at least on one side on the honeycomb core, from the inside to the outside: a curable adhesive layer and an amorphous thermoplastic film; laying-up a dry fiber layer over the ensemble; arranging the dry fiber and ensemble on a one-sided mold and confining it in a gas-tight space by arranging a vacuum sheet over the one-sided mold; and infusing the dry fiber layer under vacuum with resin.

As it can be seen in FIG. 1, each one of the first (11) and second (12) hemicylindrical structures comprises two wall-type elements (13) projecting from each corresponding inner surface towards the cylindrical interior volume defined when the hemicylindrical structures (11, 12) are coupled to each other according to step b) of the above method.

In the particular embodiment shown, the wall-type elements (13) are anti-sloshing walls.

As previously described, the sloshing motion of the fluid housed within the vessel (10) can induce significant structural loads and rigid body disturbances which may affect control system operation. The presence of the anti-sloshing walls (13) installed within the inner volume of the vessel (10), extending inwardly from an inner surface helps to attenuate sloshing of the fluid.

The anti-sloshing walls (13) are depicted having complementary geometries. In particular, the anti-sloshing walls (13) shown are divided into two halves which are respectively provided on opposite surfaces of different hemicylindrical structures (11, 12), in such a way that, when the hemicylindrical structures (11, 12) are coupled according to step b), the complementary anti-sloshing walls (13) are arranged in a particular cross-section of the vessel (10), facing each other and separated a distance in such a way that their opposite contours define a rectangular gap for allowing the fluid housed within the vessel (10) to flow therethrough.

With respect to the layup techniques carried out for providing the anti-sloshing walls (13) on the inner surface of each hemicylindrical structure (11, 12), an embodiment of the method of the invention comprises, before applying the curing cycle under vacuum: for manufacturing the first (11) and second (12) FRP structures, laying up a corresponding laminate forming each anti-sloshing wall (13) over the hemicylindrical structure (11, 12), the laminate being laid up preferably by ATL or AFP techniques.

Figure 2:
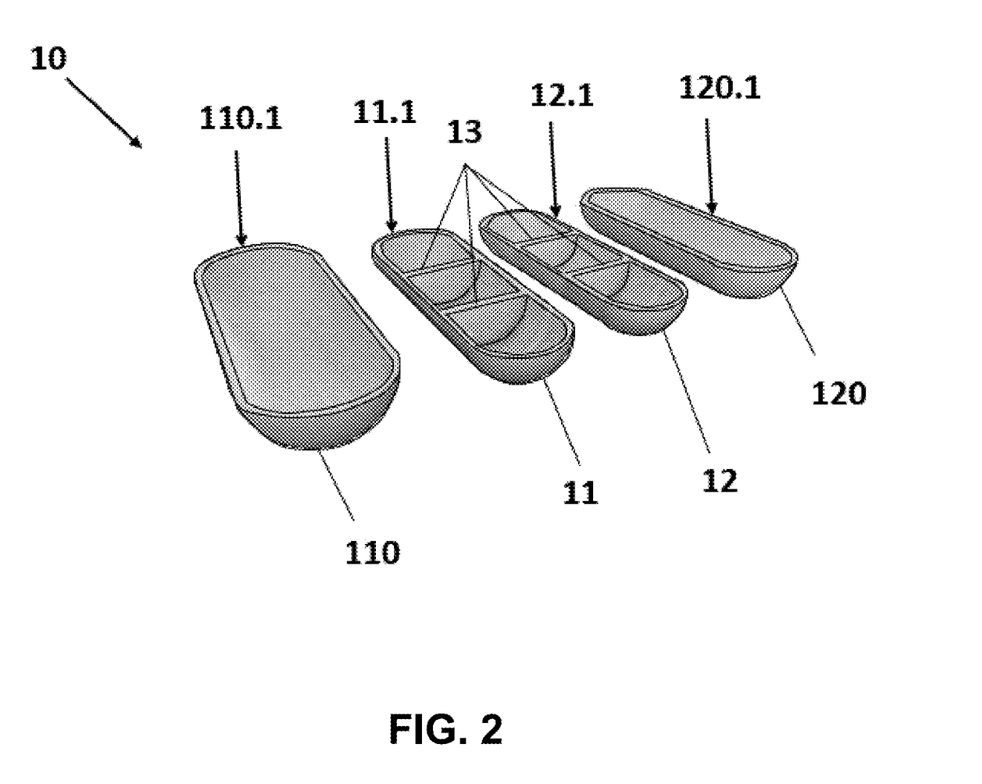
FIG. 2 shows a perspective view of two inner and two outer FRP structures according to an embodiment of the present invention.

In contrast to the first (11) and second (12) FRP structures shown in FIG. 1, FIG. 2 shows the provision of two outer FRP structures (110, 120) and, more in particular, of a third (110) and a fourth (120) FRP structures according to step d) of an embodiment of the method for obtaining a vessel (10) of the invention.

In particular, the third (110) and fourth (120) FRP structures are shaped with complementary coupling interfaces (110.1, 120.1) configured for matching with each other, such that a sheathing is defined when the third (110) and fourth (120) FRP structures are coupled to each other, the sheathing being sized for encasing the first (11) and second (12) FRP structures, contacting them on their outer surface, after they have been coupled according to step b).

As it can be seen, the third (110) and fourth (120) FRP structures, which are shown at the lateral ends of FIG. 2 are provided with a similar geometry to the first (1) and second (12) FRP structures, that is, they are shaped with closed hemicylindrical geometry, but slightly bigger in size.

By virtue of this geometry, after the first (11) and second (12) FRP structures have been coupled according to step b) of the method of the invention, the third (110) and fourth (120) FRP structures close on the first (11) and second (12) FRP structures, as a second skin or sheathing. That is, once coupled, the third (110) and fourth (120) FRP structures are in contact with the first (11) and second (12) FRP structures through the corresponding interfaces, that is, the outer surface of the first (11) and second (12) FRP structures, and the inner surface of the third (110) and fourth (120) FRP structures. In this way, the third (110) and fourth (120) FRP structures contribute to holding the first (11) and second (12) FRP structures together, also increasing the overall tightness of the vessel (10) thereby.

With respect to the techniques carried out for manufacturing each FRP structure (11, 12, 110, 120), in an embodiment, they are subjected to a curing cycle under vacuum together in a single step, thus reducing the total number of steps and associated costs involved in manufacturing a vessel (10) according the method of the invention.

According to an alternative embodiment, the third (110) and fourth (120) FRP structures shown are partially cured, that is, before being provided according to step c), they have been subjected to a partial curing cycle under vacuum at a lower temperature and/or shorter duration compared to a complete curing cycle under predetermined duration and temperature conditions according to which the third (110) and fourth (120) FRP structures would have been completely cured. According to this alternative embodiment, step e) of the method further comprises applying a curing cycle under vacuum for curing the third (110) and fourth (120) FRP structures after they have been coupled to each other according to step d), around the first (11) and second (12) FRP structures, for obtaining the vessel (10).

According to a further alternative embodiment, the first (11), second (12), third (110), and fourth (120) FRP structures are partially cured, and step e) of the method further comprises applying a curing cycle under vacuum for curing the first (11), second (12), third (110) and fourth (120) FRP structures after they have been coupled according to steps b) and d), respectively, for obtaining the vessel (10).

Figure 3:
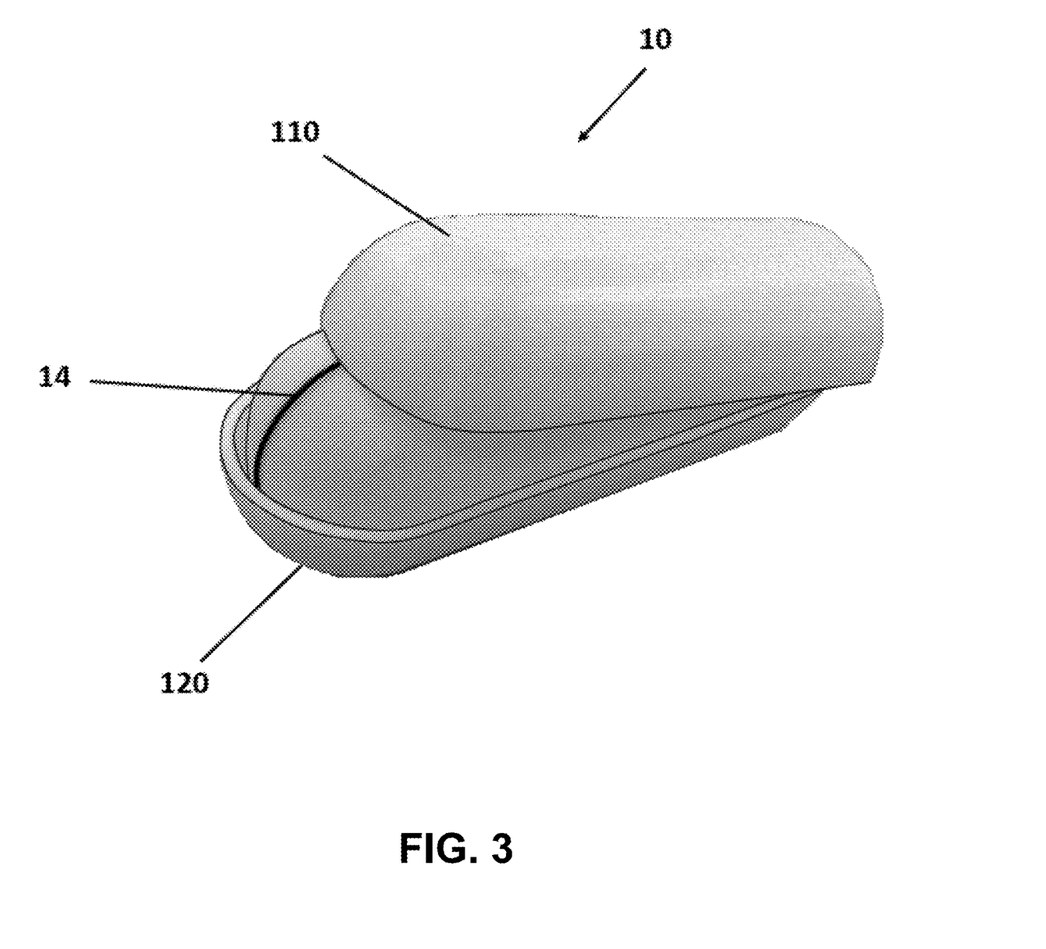
FIG. 3 shows a perspective view of two outer FRP structures provided around two inner FRP structures coupled to each other according to an embodiment of the present invention.

FIG. 3 shows some of the manufacturing steps that the present method follows to obtain a vessel (10) by assembling the first (11), second (12), third (110) and fourth (120) FRP structures shown in FIG. 2. Particularly, FIG. 3 shows the first (11) and second (12) FRP structures already coupled according to step b).

Additionally, FIG. 3 shows the third (110) and fourth (120) FRP structures in an intermediate stage of the process of being coupled to each other around the first (11) and second (12) FRP structures according to step d). In particular, the upper FRP structure, that is, the third FRP structure (110) is shown offset rearward, such that, for illustrative purposes, details of the interior of the vessel (10) are shown.

As it can be seen, the first (11) and second (12) FRP structures are provided with a first joint profile (14) in the portion of the joint defined between them that is shown.

Although the example of implementation of the method shown in FIG. 3 is in an intermediate stage of step d) of coupling the third (110) and fourth (120) FRP structures, it can be observed that, once the step d) has been completed and both FRP structures (110, 120) are coupled to each other, the joint defined between them intersects the joint defined between the first (11) and second (12) FRP structures at a right angle. In this sense, a second joint profile (not shown) is envisaged to be provided in the joint defined between the third (110) and fourth (120) FRP structures once they have been coupled according to step d).

The present invention also provides a method for manufacturing a double-wall tank (20) configured for housing a fluid within.

This method comprises:
i) providing an inner vessel (10) manufactured according to any of claims 1 to 9;
ii) providing at least two inner Fiber Reinforced Polymer (FRP) tank structures (21, 22) shaped with complementary coupling interfaces (21.1, 22.1) configured for matching with each other, such that an interior chamber is defined when the inner FRP tank structures (21, 22) are coupled to each other, the interior chamber being sized for housing the inner vessel (10) provided in step i);
iii) coupling the inner FRP tank structures (21, 22) to each other enclosing the inner vessel (10) provided in step i) within;
iv) providing at least two outer FRP tank structures shaped with complementary coupling interfaces configured for matching with each other, such that a sheathing is defined when the outer FRP tank structures are coupled to each other, the sheathing being sized for encasing the inner FRP tank structures (21, 22), contacting them along their outer surface, after they have been coupled according to step iii);
v) coupling the outer FRP tank structures to each other, encasing the inner FRP tank structures (21, 22), such that the relative position of the inner FRP tank structures (21, 22) is locked thereby; and
vi) fastening the outer FRP tank structures after they have been coupled to each other.

Figure 4:
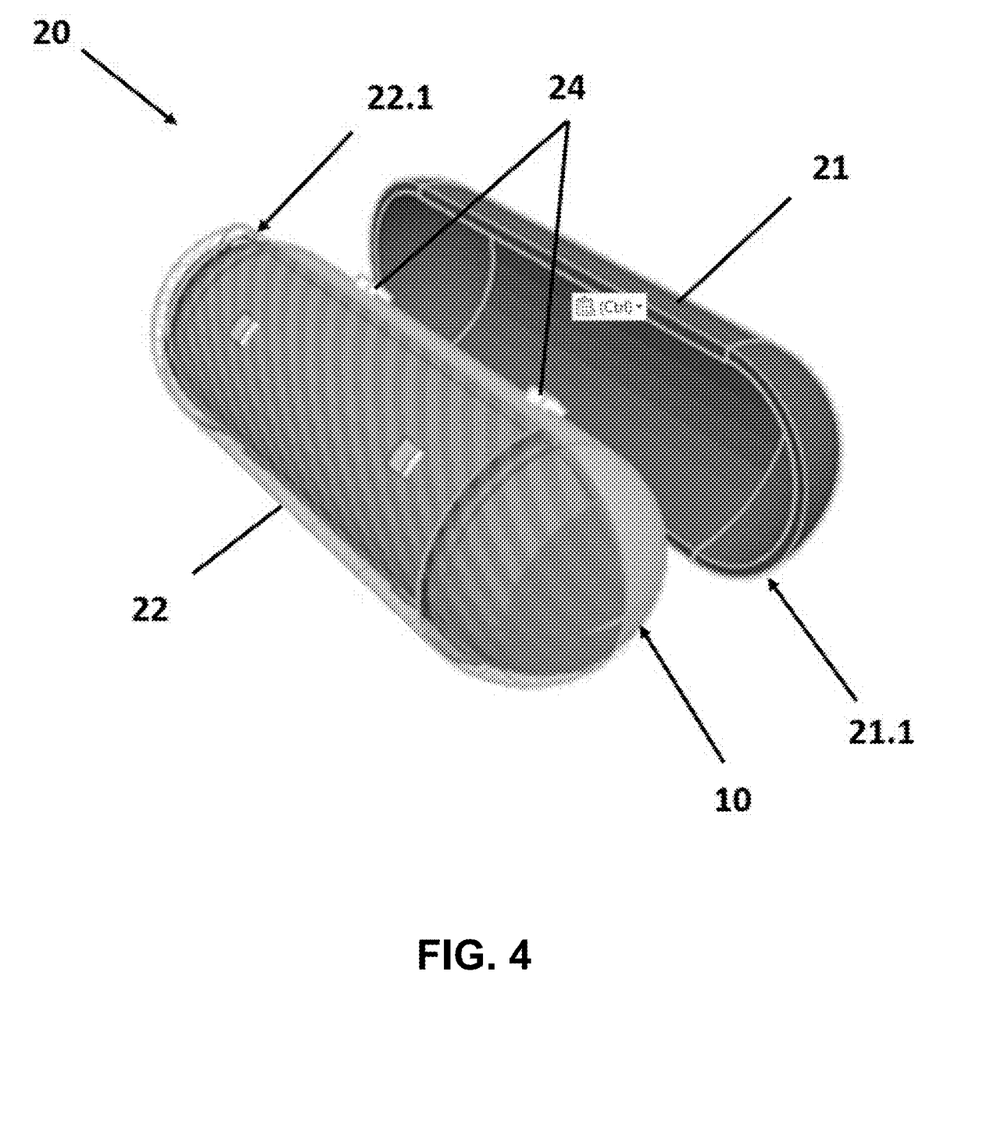
FIG. 4 shows a perspective view of two inner FRP tank structures provided around a vessel according to steps of a method for manufacturing a double-wall tank according to an embodiment of the present invention.

FIG. 4 shows some of the manufacturing steps that the present method follows to obtain a double-wall tank (20). Particularly, FIG. 4 shows the provision of an inner vessel (10) according to step i), resulting from coupling and fastening the FRP structures (11, 12, 110, 120) shown in FIGS. 2 and 3 according to steps of an embodiment of the method. FIG. 4 also shows the provision of two inner FRP tank structures (21, 22) and, more in particular, of a first (21) and second (22) hemicylindrical FRP tank structures, which are shown in an intermediate stage of the process of being coupled to each other around the inner vessel (10) according to step iii). In particular, the first FRP tank structure (21), which is shown in the back, is shown offset backward, such that, for illustrative purposes, details of the interior of the double-wall tank (20) are shown.

As it can be seen, the first (21) and second (22) FRP tank structures provided in step ii), once coupled according to step iii) of the method, confine the inner vessel (10) within. A third joint profile (not shown) is envisaged to be provided in the joint defined between the first (21) and second (22) FRP tank structures once they have been coupled.

Additionally, the embodiment of the method shown in FIG. 4 also comprises, as part of the step of completing the coupling of the first (21) and second (22) FRP tank structures, the provision of a two-axis mount (not shown) coupled to the second and third joint profiles such that the inner vessel (10) and the first (21) and second (22) FRP tank structures coupled according to step iii) are articulated thereby. By the provision of the two-axis mount, coupled to the second joint profile of the inner wall (i.e., the vessel (10) provided in step i)) and to the third joint profile of the outer wall of the tank (20), the second and third joint profiles are articulated with two degrees of freedom such that a flexible coupling is provided between the vessel (10) and the outer wall of the tank (20).

Finally, the embodiment of a double-wall tank (20) manufactured by the method of FIG. 4 also comprises a thermal insulation layer (not shown) enveloping the vessel (10) provided in step i). The thermal insulation layer is arranged in the space confined between the inner wall of the tank (20) (i.e., the vessel (10)) and the outer wall of the tank (20). In an embodiment, the method comprises maintaining the thermal insulation layer in a vacuum.

Furthermore, in order to define an intermediate gap disposed around the inner vessel (10), between its outer side and the outer wall of the tank (20), a plurality of spacers (24) are provided onto the outer surface of the inner vessel (10) for maintaining the outer wall of the tank (20) (which in the particular example shown in FIG. 3 is formed by the two hemicylindrical at FRP tank structures (21, 22)) at a predetermined distance from the inner vessel (10).

As it can be seen, the spacers (24) are embodied as a plurality of discrete mechanical spacers (24) provided with a rectangular cross-section and distributed around the vessel (10).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a vessel configured for housing a fluid within, said method comprising:
    a) providing at least two inner Fiber Reinforced Polymer (FRP) structures shaped with complementary coupling interfaces configured to match with each other, such that an interior volume is defined when said inner FRP structures are coupled to each other;
    b) coupling the inner FRP structures to each other;
    c) providing at least two outer FRP structures shaped with complementary coupling interfaces configured to match with each other, such that a sheathing is defined when the outer FRP structures are coupled to each other, said sheathing being sized for encasing the inner FRP structures, contacting them on their outer surface, after they have been coupled according to step b);
    d) coupling the outer FRP structures to each other, encasing the inner FRP structures, such that a relative position of the inner FRP structures is locked thereby; and
    e) fastening the outer FRP structures after they have been coupled to each other.

2. The method according to claim 1 further comprising providing a first joint profile at least on a portion of a joint defined between inner FRP structures.

3. The method according to claim 1 further comprising a second joint profile at least on a portion of a joint defined between the outer FRP structures.

4. The method according to claim 1, wherein at least one of the inner FRP structures or the outer FRP structures comprise couplings provided on the corresponding coupling interfaces; said couplings interlocking with each other when at least one of the inner FRP structures are coupled according to step b) or the outer FRP structures are fastened according to step e), respectively.

5. The method according to claim 1, wherein at least one of the inner FRP structures provided in step a) comprises at least one of at least one baffle or wall element projecting from a surface of said FRP structure towards the interior volume defined when the inner FRP structures are coupled to each other according to step b).

6. The method according to claim 1,
    wherein the outer FRP structures provided in step c) are partially cured; and
    wherein step e) comprises applying a curing cycle under vacuum for curing said outer FRP structures after they have been coupled to each other according to step d).

7. The method according to claim 1,
    wherein the inner and outer FRP structures are partially cured; and
    wherein step e) further comprises applying a curing cycle under vacuum for curing said inner and outer FRP structures after they have been coupled according to steps b) and d), respectively.

8. The method according to claim 1, wherein the outer FRP structures are coupled such that a joint line defined between them intersects a joint line defined between the inner FRP structures at an oblique angle.

9. A method for manufacturing a double-wall tank configured for housing a fluid within, said method comprising:
    i) providing an inner vessel manufactured according to claim 1;
    ii) providing at least two inner Fiber Reinforced Polymer (FRP) tank structures shaped with complementary coupling interfaces configured for matching with each other, such that an interior chamber is defined when said inner FRP tank structures are coupled to each other, said interior chamber being sized for housing the vessel provided in step i) such that a gap is defined between the outer side of the inner vessel and the inner side of the inner FRP tank structures when the inner vessel is housed within the interior chamber;

iii) coupling the inner FRP tank structures to each other enclosing the inner vessel provided in step i) within;

iv) providing at least two outer FRP tank structures shaped with complementary coupling interfaces configured for matching with each other, such that a sheathing is defined when said outer FRP tank structures are coupled to each other, said sheathing being sized for encasing the inner FRP tank structures, contacting them along their outer surface, after they have been coupled according to step iii);

v) coupling the outer FRP tank structures to each other, encasing the inner FRP tank structures, such that the relative position of the inner FRP tank structures is locked thereby; and vi) fastening the outer FRP tank structures after they have been coupled to each other.

10. The method according to claim 9 further comprising, before step iii), providing at least a thermal insulation layer enveloping the inner vessel.

11. The method according to claim 9, wherein the inner FRP tank structures or the outer FRP tank structures comprise couplings provided on the corresponding coupling interfaces; said couplings interlocking with each other when at least one of the inner FRP tank structures are coupled according to step iii) or the outer FRP tank structures are fastened according to step vi), respectively.

12. The method according to claim 9, further comprising providing at least one of a third joint profile at least on a portion of a joint defined between the inner FRP tank structures or a fourth joint profile at least on a portion of a joint defined between outer FRP tank structures.

13. The method according to claim 9, further comprising providing at least one spacer between the outer side of the inner vessel and the inner side of the inner FRP tank structures for maintaining the inner FRP tank structures at a predetermined distance from the inner vessel.

14. The method according to claim 9,
wherein the outer FRP tank structures provided in step iv) are partially cured; and
wherein step vi) further comprises applying a curing cycle under vacuum for curing said outer FRP tank structures after they have been coupled to each other according to step v).

15. The method according to claim 9,
wherein the inner and outer FRP tank structures are partially cured; and
wherein step vi) further comprises applying a curing cycle under vacuum for curing said inner and outer FRP tank structures after they have been coupled according to steps iii) and v), respectively.

* * * * *